United States Patent [19]

Föller

[11] 4,060,193
[45] Nov. 29, 1977

[54] THERMALLY CONTROLLED VALVE

[75] Inventor: Werner Föller, Stuhr-Heiligenrode, Germany

[73] Assignee: Gestra-KSB Vertriebsgesellschaft mbH & Co. Kommanditgesellschaft, Bremen, Germany

[21] Appl. No.: 695,606

[22] Filed: June 14, 1976

[30] Foreign Application Priority Data

June 23, 1975 Germany .................. 2527851

[51] Int. Cl.² .............................................. F16T 1/04
[52] U.S. Cl. ........................................ 236/59; 251/84
[58] Field of Search .............................. 236/56–60; 251/84, 87

[56] References Cited

U.S. PATENT DOCUMENTS

| 536,108 | 3/1895 | Thorpe | 251/84 X |
|---|---|---|---|
| 1,619,866 | 3/1927 | Hoeschen | 236/57 X |
| 1,942,417 | 1/1934 | Ferlin et al. | 251/84 X |
| 2,079,666 | 5/1937 | Snyder | 251/87 X |
| 2,738,158 | 3/1956 | Fuglie | 251/84 X |
| 2,745,627 | 5/1956 | Winfree | 251/84 X |
| 3,157,198 | 11/1964 | Wanner | 251/84 X |
| 3,286,926 | 11/1966 | Domm et al. | 236/59 |
| 3,353,746 | 11/1967 | Foller | 236/59 |

Primary Examiner—William F. O'Dea
Assistant Examiner—William E. Tapolcai, Jr.
Attorney, Agent, or Firm—Allison C. Collard

[57] ABSTRACT

A thermally controlled steam trap valve with a housing having an internal chamber which is connected to the inlet and also including an outlet. There is a valve seat disposed in the housing for covering the outlet and a valve shaft which has a spherically shaped valve member mounted on the shaft for closing off the valve seat in response to a bimetallic element. Guide pin elements in the form of bushings are disposed in the housing at opposite ends of the shaft and have diametrical clearances which are coordinates with the axial spaces between the center point of the spherical valve member and the points of contact with the shaft with the guide bushings. In another embodiment the valve seat has a yoke with ribs extending over the bimetallic element. The valve member has radial guide shoulders which include openings for the discharge which cooperate with the inner wall of one of the bushings.

7 Claims, 4 Drawing Figures

THERMALLY CONTROLLED VALVE

The subject invention relates to thermally controlled valves and in particular, steam traps having a bimetallic element for opening and closing the valve in response to temperature changes.

In order to have the correct dimension tolerances to permit an inexpensive valve to be mass produced, the guide of the valve shaft may have a noticeable diametrical clearance.

Moreover, due to the flowing medium as well as the unsymmetrical effect of the bimetal control element onto the valve shaft, a tilting moment is exerted on the valve shaft. In known valves of this type, such tilting motion results in an eccentric displacement of the valve member with respect to the valve seat. Accordingly, the valve member engages the valve seat only on one side when it closes with the aid of the bimetal control element. Very often the actuation forces of the bimetal control element are not sufficient to bring the engaged valve seat portion in a concentric position against the friction forces between the valve member and the valve seat.

It is therefore an object of the invention to improve the valves of the aforementioned type so that a tight seal is obtained without requiring any tighter diametrical clearance between the valve shaft and the guide elements. As shown, the tilting moment provided an engagement of the valve shaft on the two guide elements at diametrically opposite points.

Therefore, the inventive features assure a concentric positioning of the valve member on the valve seat even if the valve shaft assumes an oblique or tilted position. Thus, a tight seal is provided.

Other objects and features of the present invention will become apparent from the following detailed description when taken in connection with the accompanying drawings which disclose several embodiments of the invention. It is to be understood however that the drawings are designed for the purposes of illustration only, and are not intended as a definition of the limits and scope of the invention disclosed.

In the drawings, wherein similar reference numerals denote similar elements throughout the several views.

Figure 1:
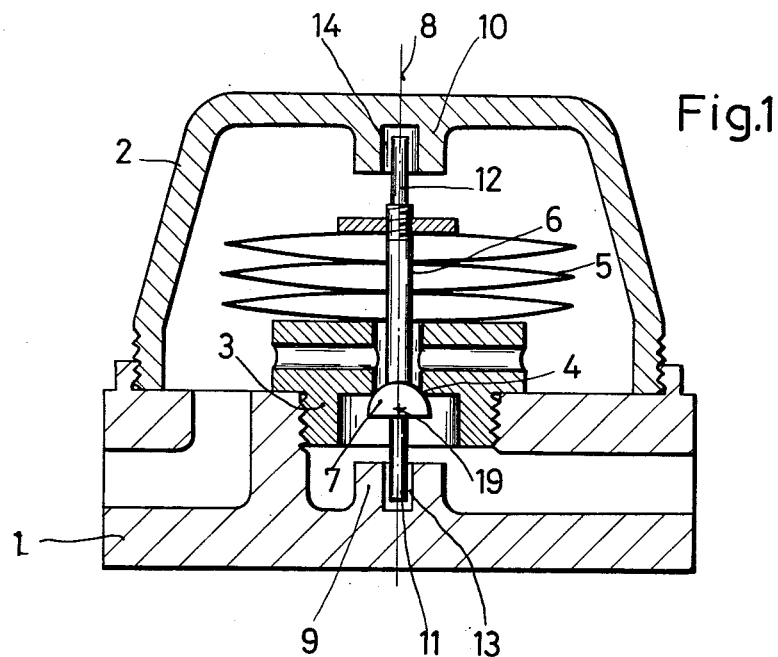
FIG. 1 shows a thermally controlled steam trap according to the invention in its closed position.
Figures 2, 3:
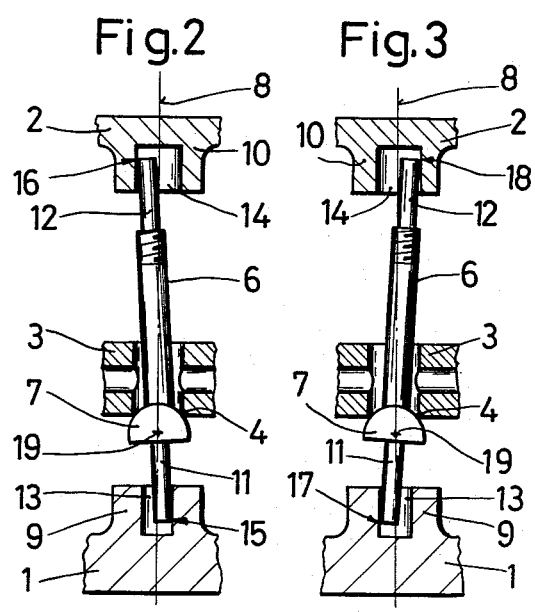
FIGS. 2 and 3 shows the valve member with obliquely positioned valve shaft in accordance with FIG. 1.

Referring to FIG. 1, there is shown a valve seat element 3, with a cone-shaped valve seat in a steam trap housing consisting essentially of a lower part 1 and a cover 2. A bimetal element 5 is supported by valve seat element 3 which adjusts the stroke of valve shaft 6. Shaft 6 is provided with a valve member 7 positioned between its two ends which cooperates with a valve seat 4. Individual guide bushings 9 and 10 are each provided on both sides of valve seat 4, and coaxial toward its center axis 8, and are mounted on housing cover 2 and lower housing part 1. Both ends of guide or valve shaft 6 are shaped into guide pins 11 and 12 which axially extend into guide bushings 9 and 10. A diametrical clearance 13 and 14 is provided between guide pins 11 and 12 and guide bushings 9 and 10. In such traps, the valve shaft does not assume a coaxial position of valve seat 4 with respect to its center axis 8 when in operation and as shown in FIG. 1. Due to the influence of the flow medium to be controlled, as well as due to the unsymmetric forces of bimetal control element 5, valve shaft 6 is in an oblique position and radially engages with its guide pins 11 and 12 at diametrically opposed points 15 and 16, or 17 and 18, respectively, the guide bushings 9 and 10, as can be seen in FIGS. 2 and 3.

For this reason, the valve member is spherically shaped for engagement with valve seat 4. In the embodiment shown, diametrical clearances 13 and 14 are not of the same dimension but are coordinated with respect to the axial distance of the corresponding guide bushings 9 or 10 to valve seat 4. Thus, diametrical clearances 13 and 14 are in a ratio with respect to each other which is proportional to the ratio of distance between the spaces which are present between the spherical center point 19 of the closed valve member 7, and the engagement point 16 or 18, on the one hand, and the spherical center point 19 and the engagement point 15 or 17 of valve shaft 6 and guide bushings 9 and 10, on the other hand.

The result of this arrangement is that spherical center point 19 of the closed valve member engages center axis 8 despite the oblique position of valve shaft 6 thus assuring a tight seal.

Figure 4:
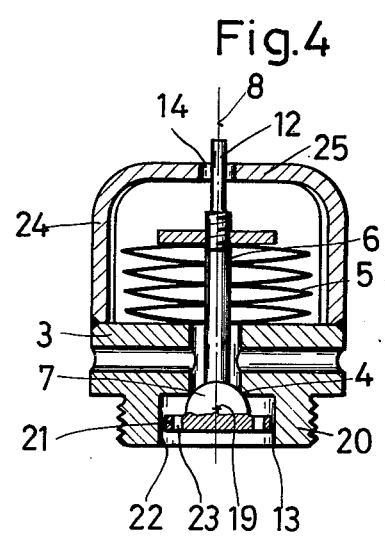
FIG. 4 shows another embodiment of the control unit of the thermally controlled steam trap.

FIG. 4 shows the control unit of the steam trap with another particularly advantageous embodiment of the guide elements. The guide pin which is mounted at the discharge side is shaped by discharge bushing 20 which surrounds valve member 7 radially of valve seat element 3. Valve member 7 is provided with a radial circumferentially running shoulder 21 which for guiding valve member 7 cooperates with inner wall 22 of discharge bushing 20. Furthermore, the radial shoulder 21 is provided with axial openings 23 for discharging the medium.

For guidance during the flow, valve member 7 and valve seat element 3 carries a yoke 24 which extends over bimetal element 5. The yoke is mounted with its ends lateral from the control element on valve seat element 3, while yoke rib 25 serves as a guide element for guide pin 12 of valve spindle 6.

In this embodiment, the guide elements form a part of the control unit which includes valve seat element 3, valve member 7, the bimetal control element 5. This arrangement permits an easy exchange or replacement of a new control unit without difficulty.

While only two embodiments of the present invention have been shown and described, it will be obvious to those skilled in the art that many changes and modifications may be made thereunto without departing from the spirit and scope on the invention.

What is claimed is:

1. A thermally-controlled valve comprising:
   a housing having an internal chamber which is communicative to an inlet and outlet;
   a valve seat element disposed in said housing having a valve seat for communicating the outlet to the inlet;
   a valve shaft slidably retained in said housing and extending through the opening defined by said valve seat and including a spherically-shaped, valve member communicative with said valve seat element;
   guide bushing elements diposed in said housing and having diametrical clearances for retaining at least a portion of said valve shaft on opposite sides of said valve seat; and a bimetallic element coupled to said shaft and in engagement with said valve seat element, for opening and closing said valve member, wherein the dimensions of the diametrical clearances between said guide bushing elements and said valve shaft portions are in a ratio with respect to each other which is proportional to the ratio of distances between the spherical center point of said valve member and the points at which said valve shaft radially engages said guide bushing elements when said valve member is in its closed position, whereby, upon engagement of said valve shaft with said guide bushing elements, said spherical center point of said valve member is aligned with the center axis of the opening defined by said valve seat.

2. The valve in accordance with claim 1 wherein said guide elements are bushings secured in said housing.

3. The valve in accordance with claim 2 wherein at least one end of said valve shaft is in the form of a guide pin which axially engages said guide bushing.

4. The valve according to claim 1 wherein the guide element which is located on the discharge side is formed by a discharge bushing of said valve seat which surrounds said valve member, said valve member having a radial guide shoulder which cooperates with the inner wall of the bushing.

5. The valve according to claim 4 wherein said guide shoulder is radially arranged and includes openings for the discharge of the medium.

6. The valve according to claim 5 wherein said valve seat element includes a yoke extending over said bimetallic element, said yoke having ribs located at the inflow side.

7. The valve according to claim 6 wherein said yoke is held with its ends laterally with respect to said bimetallic control element on said valve seat, while said yoke rib forms the guide element for supporting said valve shaft.

* * * * *